United States Patent [19]

Prueitt et al.

[11] Patent Number: 4,992,696
[45] Date of Patent: Feb. 12, 1991

[54] APPARATUS HAVING REDUCED MECHANICAL FORCES FOR SUPPORTING HIGH MAGNETIC FIELDS

[75] Inventors: Melvin L. Prueitt; Fred M. Mueller; James L. Smith, all of Los Alamos, N. Mex.

[73] Assignee: The United States of America as represented by the United States Department of Energy, Washington, D.C.

[21] Appl. No.: 311,998

[22] Filed: Feb. 17, 1989

[51] Int. Cl.$^5$ .......................... H05H 1/10; H01J 1/50
[52] U.S. Cl. .............................. 313/154; 313/231.31; 313/231.41; 315/111.71; 335/216; 376/137; 376/139; 376/121
[58] Field of Search ...................... 313/231.41, 231.31, 313/154; 315/111.71; 335/216; 376/121, 133, 137, 139

[56] References Cited

U.S. PATENT DOCUMENTS 4,430,600 2/1984 Sheffield et al. ............... 315/111.71
4,650,631 3/1987 Knorr ................................ 376/127
4,808,954 2/1989 Ito ..................................... 335/216

OTHER PUBLICATIONS

L. J. Campbell et al., "Stationary Configurations of Point Vortices and Other Logarithmic Objects in Two Dimensions", Phys. Rev. Lett. 58, 670 2/87.
James B. Kadtke et al., "Method for Finding Stationary States of Point Vortices", Phys. Rev. A 36, 4360 11/87.

Primary Examiner—Palmer C. DeMeo
Attorney, Agent, or Firm—Samuel M. Freund; Paul D. Gaetjens; William R. Moser

[57] ABSTRACT

The present invention identifies several configurations of conducting elements capable of supporting extremely high magnetic fields suitable for plasma confinement, wherein forces experienced by the conducting elements are significantly reduced over those which are present as a result of the generation of such high fields by conventional techniques. It is anticipated that the use of superconducting materials will both permit the attainment of such high fields and further permit such fields to be generated with vastly improved efficiency.

6 Claims, 6 Drawing Sheets

Fig. 6

APPARATUS HAVING REDUCED MECHANICAL FORCES FOR SUPPORTING HIGH MAGNETIC FIELDS

BACKGROUND OF THE INVENTION

The present invention relates generally to conductor configurations useful for generating magnetic fields having various properties and more particularly to conductor configurations which have reduced mechanical forces useful for generating high magnetic fields. The United States Government has rights in this invention pursuant to Contract No. W-7405-ENG-36 between the Department of Energy and the University of California.

There has been strong interest in cusp magnetic field configurations for a variety of applications. For example, in the area of magnetic field plasma confinement, since the field line curvature of such configurations is always convex toward the plasma, magnetic hydrodynamic stability results. However, in the region of the cusps themselves, the field lines are disposed such that there can be significant plasma particle loss. A solution to this problem is to reduce plasma particle losses by increasing the cusp field strength. With the advent of superconducting materials showing potential for superconductivity above 100 tesla, the possibility of such high magnetic field strengths is promising. A primary problem with such high fields produced by superconductors is a mechanical one. Large resulting forces require rugged support structures. For example, parallel conductors spaced apart evenly around a cylindrical surface, each having a dc current flowing in the opposite direction to its nearest neighbors, produce a cusp magnetic field within the cylinder. All conductors experience a positive force along the radius of the cylinder. A conductor in a 100 tesla field carrying one million amperes experiences a force of 10,000 metric tons per meter of length. Large cross-section supports also form heat paths, thereby complicating the refrigeration problem.

Two publications addressing the subject of locating stationary states of flowing systems with sources having localized logarithmic potentials describe solutions to that problem which are mathematically equivalent in some instances to that of finding low-force configurations of electric current carrying wires. In "Stationary Configurations Of Point Vortices And Other Logarithmic Objects In Two Dimensions," by L. J. Campbell and James B. Kadtke, Phys. Rev. Letters 58, 670 (1987), and in "Method For Finding Stationary States Of Point Vortices," by James B. Kadtke, and L. J. Campbell, Phys. Rev. A 36, 4360 (1987) the authors show equilibrium (force-free) configurations (which would yield zero magnetic forces if the vortices depicted therein were replaced by straight wires having electric current flow in the directions indicated). However, there is no teaching or identification by the authors of any relationship between the abstract formalism presented and low magnetic force obtainable in certain electric conductor configurations. In fact, the problems specifically addressed are vortex lines, line charges, and parallel screw dislocations.

Accordingly, it is an object of the present invention to identify low-force conductor configurations for providing high magnetic fields having chosen patterns.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the magnetic plasma confinement apparatus of this invention may include a first set of substantially parallel, electrically isolated, elongated conducting elements having electrical currents flowing therein, spaced apart in a substantially equally distant manner around an outer circle, and a second set of substantially parallel, electrically isolated, elongated conducting elements having an electrical current flowing therein in a direction opposite to the direction of the current flowing in the first set, spaced apart in a substantially equally distant manner around an inner circle, each conductor in the second set of conductors disposed such that an equal angle is subtended to the two closest neighboring conductors of the first set of conductors, wherein the ratio of the magnitude of the current flowing in the first set of electrical conductors to that flowing in the second set, and the ratio of the diameter of the outer circle to the diameter of the inner circle are selected such that the net force on the conducting elements is substantially zero away from the ends thereof.

In another aspect of the present invention, in accordance with its objects and purposes, the magnetic plasma confinement apparatus hereof includes an array of equally spaced, helically wound elongated conductors, each conductor carrying the same current, but alternate conductors carrying current in the opposite direction.

In yet another aspect of the present invention, in accordance with its objects and purposes, the magnetic plasma containment apparatus hereof may include a set of electrically isolated, approximately circular conducting rings disposed such that the axis of approximate symmetry of each conducting ring is substantially colinear with the axis of the nearest circular conducting ring thereto, each of the conducting rings having an electric current flowing in the opposite direction to the electric current flowing in its nearest neighbors.

Benefits and advantages of the present invention include the ability to generate substantial magnetic fields in conductor configurations in which the mechanical forces on the conductors have been significantly reduced.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE PREFERRED EMBODIMENTS

Reference will now be made to the present preferred embodiments of the invention, examples of which are illustrated in the accompanying drawings. Similar structure is denoted by the same callouts. Briefly, the present invention identifies several configurations of conducting elements capable of supporting extremely high magnetic fields wherein forces experienced by the conducting elements are significantly reduced over those which are present as a result of the generation of such high fields by conventional techniques. It is anticipated that the use of superconducting materials will both permit the attainment of such high fields and further permit such fields to be generated with vastly improved efficiency.

The simplest configuration of conductors for consideration of a force-free or reduced-force array is that of straight wires. If one neglects the stress produced by a given current carrying wire on itself, the net force on a given wire results from the summation of the forces due to the magnetic field produced by each of the other wires. There are two components to this force for very long wires. If there are N wires, there are 3N-3 degrees of freedom which may be adjusted; that is, the position x, y and the current I for each wire, and 2N relationships among the wires which may be used to make the force per meter on every wire equal to zero. The general situation for N wires leaves N-3 unspecified free parameters. Thus, there is enormous freedom in the geometry of force-free configurations, and the choice of actual conductor arrangement will be determined by practical considerations. The magnetostatics of the fields and forces on rings is more complicated than that of straight wires, but the principles involved are similar. However, ring structures are likely to prove valuable since current return in straight wires involves more of a problem than that for ring structures. Forces on such return conductors are not zero and large wire spacing is anticipated to keep these forces to a minimum.

Having generally described the invention, the following examples set forth the details of specific embodiments thereof.

EXAMPLE I

There are configurations of conductors for which the sum of the magnetic forces exerted on each conductor is zero. A set of parallel conducting elements arranged around an axis of symmetry with electric currents flowing in opposite directions in alternate conductors produce a cusp magnetic field within the volume bounded by the conductors, but all conductors experience a positive radial local force. By local force it is meant the force created by long, straight conductors on one another. By increasing the current on every second conductor and decreasing the distance from the axis of symmetry of the conductors between those conductors, a unique solution can be found which provides zero local forces on each conductor. There are forces exerted on the wires by return currents, but these forces can be made small by removing the return currents to some large distance.

Figure 1:
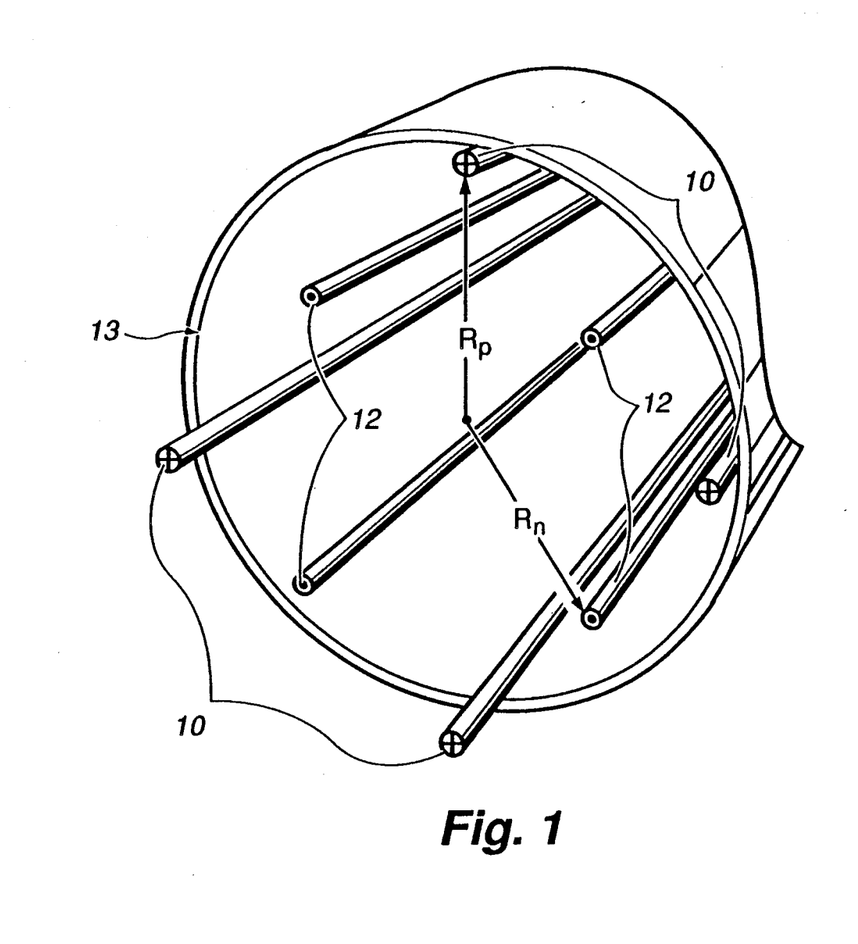
FIG. 1 is a schematic representation of a configuration of eight conductors for which the sum of the magnetic forces exerted on each conductor by the others is zero. Two concentric rings of four, equally spaced conductors in each ring surrounded by a containment vessel are illustrated. Equal electrical current flows in the same direction in each conducting member of a ring.

FIG. 1 hereof is a schematic representation of a cross section of one such system. Therein, four conducting elements 10, all carrying current in the same direction, are spaced apart equally distant from one another about an outer circle having radius $R_p$, and four conducting elements 12, all carrying current in the same direction, but in a direction opposite to the current in the conductors located on the outer circle, are spaced apart equally distant from one another about an inner circle having radius $R_n$. Each inner conductor 12 is located along a radius which approximately equally divides the angle between two outer conductors 10. Positive currents ($I_p$) are depicted as flowing normal to and into the page, while negative currents ($I_n$) are indicated as flowing normal to and out of the page. All of the positive currents have the same magnitude as do all of the negative currents in this embodiment of our invention. For the eight-conductor system illustrated, if one adjusts the ratio of the radii, $R_n/R_p$, to be 0.6718752 and the ratio of the magnitudes of the currents, $I_n/I_p$, to be 0.4514162, the local force on each conductor is zero no matter how large the currents carried are. "Pinch" magnetic forces have been neglected; that is, the force that each conductor exerts on itself. Such forces are not directed in such a manner that there would be a tendency for a wire to move in a particular direction. Table I provides the radius and current ratios giving rise to near zero net forces on configurations of conductors for a sampling of even-numbered wire sets.

TABLE I

| Number of Elements | $R_n/R_p$ | $I_n/I_p$ |
|---|---|---|
| 4 | 0.2679492 | 0.2679492 |
| 6 | 0.5264411 | 0.3819660 |
| 8 | 0.6718752 | 0.4514162 |
| 10 | 0.7578583 | 0.5000000 |
| 12 | 0.8126505 | 0.5366750 |
| 14 | 0.8498053 | 0.5657415 |
| 16 | 0.8762631 | 0.5895738 |
| 18 | 0.8958475 | 0.6096118 |
| 20 | 0.9108026 | 0.6267890 |
| 30 | 0.9511343 | 0.6867739 |
| 50 | 0.977248 | 0.750000 |

TABLE I-continued

| Number of Elements | $R_n/R_p$ | $I_n/I_p$ |
|---|---|---|
| 100 | 0.991965 | 0.817350 |
| 150 | 0.995631 | 0.848560 |

The forces approach zero as the ratios given above are more accurately approximated. Conversely, deviations therefrom increase the forces. Such configurations should have value for magnetic confinement of plasmas in controlled thermonuclear reactors, where a major problem with present designs is the large magnetic forces which are exerted by the conductors on each other. These forces place restrictions on the strength of the magnetic fields that may be produced without structural problems. In actual operation, the assembly of conducting elements 10. 12 would be surrounded by a vacuum chamber 13 into which the plasma would be introduced.

Figure 2:
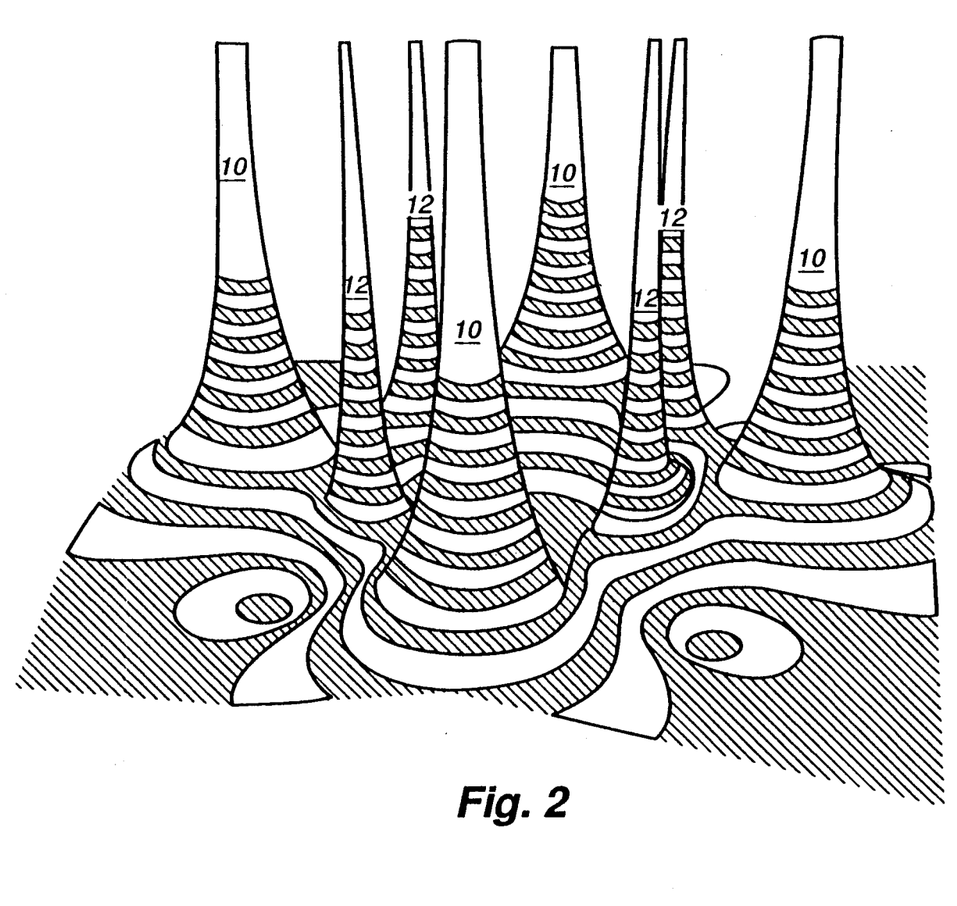
FIG. 2 is a representation of the strength of the magnetic field in the vicinity of the conductors described in FIG. 1 hereof as viewed in from the side of the configuration. The strength of the field is characterized by the height of the features, the highest fields being present in the vicinity of the conductors due to the current flowing in that conductor.

FIG. 2 hereof is a representation of the strength of the magnetic field in the vicinity of the conductors described in FIG. 1 hereof as viewed in from the side of the configuration. The field is zero in the region of the axis of symmetry of the configuration and large in the immediate environs of the conductors.

Figure 3:
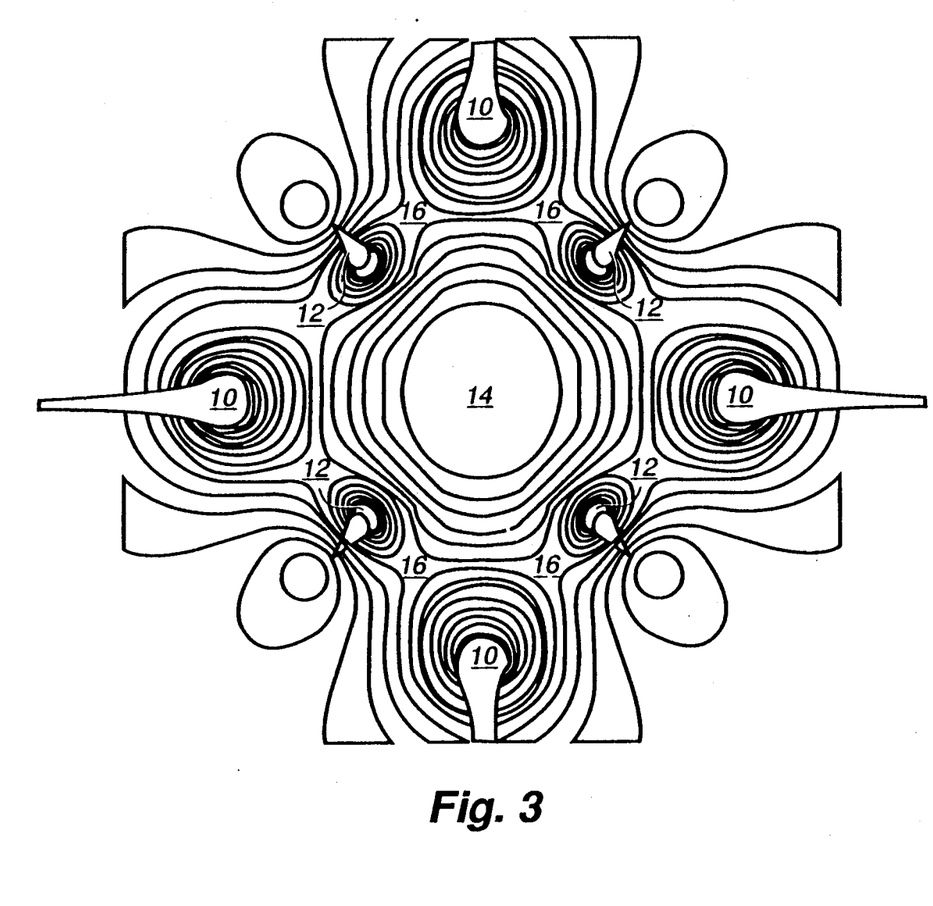
FIG. 3 is a representation of the strength of the magnetic field in the vicinity of the conductors described in FIG. 1 hereof as viewed along the axis of the configuration. The contours follow paths of equal magnetic field strength.

FIG. 3 is a representation of the strength of the magnetic field in the vicinity of the conductors described in FIG. 1 hereof as viewed along the axis of the configuration. In the usual cusp field, charged particles that are directed into the center of a cusp can escape. However, as can be observed in FIG. 3, charged particles located in central region 14 do not have a straight line path through a cusp 16. Charged particles spiral along magnetic field lines, but collisions cause the particles to migrate across field lines. As a particle approaches the region between two conductors, the increased magnetic field experienced by the particle tends to reflect the particle. Particles having sufficient energy can exit the high field region. Since the stresses on the conductors can be made quite small, the conductors may be suspended in the free space of a containment vessel.

One important feature of the embodiment of our invention illustrated in FIG. 1 hereof is that the net magnetic field is minimized at each conductor. That is, each conductor is located where the magnetic field due to all other conductors is substantially zero. The conductor experiences only its own self-magnetic field. This is of significance when using superconducting materials since such materials lose superconductivity above a critical field which depends on the material itself, or in conventional conductors due to their high magneto-resistance in high magnetic fields.

It can be shown that a plasma located within region 14 exerts a force on the conductors. This effect can be compensated for by a small decrease in the magnitude of both the current and radii ratios.

The configuration illustrated in FIG. 1 hereof has a net current flowing in one direction since the outer conductors carry more current than the inner conductors. This current must be returned to the configuration by conductors external to the configuration. If the return path is located distant from the apparatus, the forces experienced by the principal conducting elements will be small. However, the magnetic pollution of such a device is not minimal.

Figure 4:
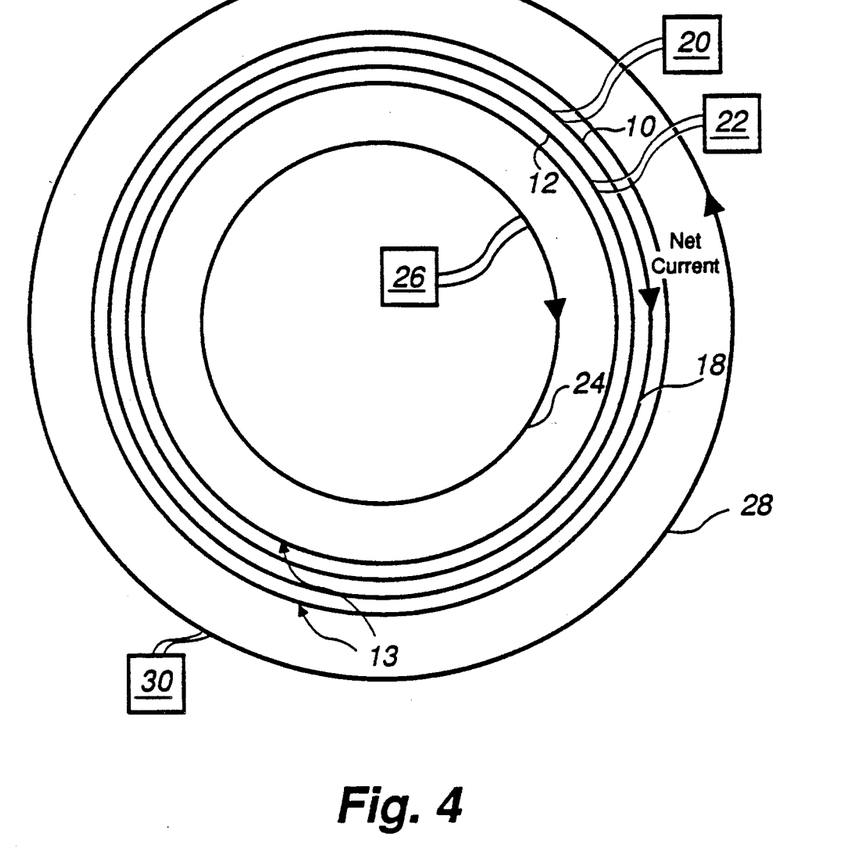
FIG. 4 is a schematic representation of a plasma confinement apparatus of the type illustrated in FIG. 1 hereof which has been formed into a loop. Current carrying inner support ring and outer support ring are designed to reduce the radial hoop stress on the confinement apparatus, but provide some force on the individual conductors as an undesired consequence.

The return current problem can be minimized by bending the structure into a ring. However, due to the net current flowing around the torus, the conductors experience some forces. These forces can be reduced by making the ring diameter large, and by placing support rings bearing compensating currents inside and outside of the confinement ring. The inner ring would pull inward, while the outer ring pushes inward to compensate for the forces tending to expand the confinement ring. FIG. 4 is a schematic representation of a plasma confinement apparatus 18 of the type illustrated in FIG. 1 hereof which has been formed into a circle. Electric current supply 20 energizes conductors 10 while supply 22 provides electric current to conductors 12 of FIG. 1 hereof. Inside current carrying support ring 24 powered by current supply 26, and outside current carrying support ring 28 fed by current supply 30 are designed to reduce the radial hoop stress on loop 18. Net currents flowing through the identified structure are illustrated by the arrows. Although the net forces on the wires in loop 18 are not zero as in the linear configuration, the hoop forces tending to expand the loop may be reduced to acceptable levels without producing large forces internal to the loop.

Assuming that a loop 50 m in diameter has a cross section with a diameter of 1 m has 5 conductors located equally spaced around the perimeter thereof each carrying $1 \times 10^6$ amperes, the local force on each wire will be $2 \times 10^5$ newtons/meter of length (41,000 lbs per yard) as a result of nearby wires. An additional force is created by the torus itself. This force acts in the radial direction tending to expand the torus and would be approximately $2 \times 10^4$ newtons/meter. If one then places an additional 5 conductors half-way between each of the original wires and moves them inward while keeping them equally spaced around a perimeter having 0.7578583 m in diameter, each of the inner conductors carrying $5 \times 10^5$ amperes in the opposite direction to the current in the outer conductors, the local forces are reduced to zero and the outward radial force on the torus is reduced to 5000 newtons/meter.

It should be mentioned at this point that the above-described conductor configurations have value in storing substantial magnetic energy as well.

Figure 5:
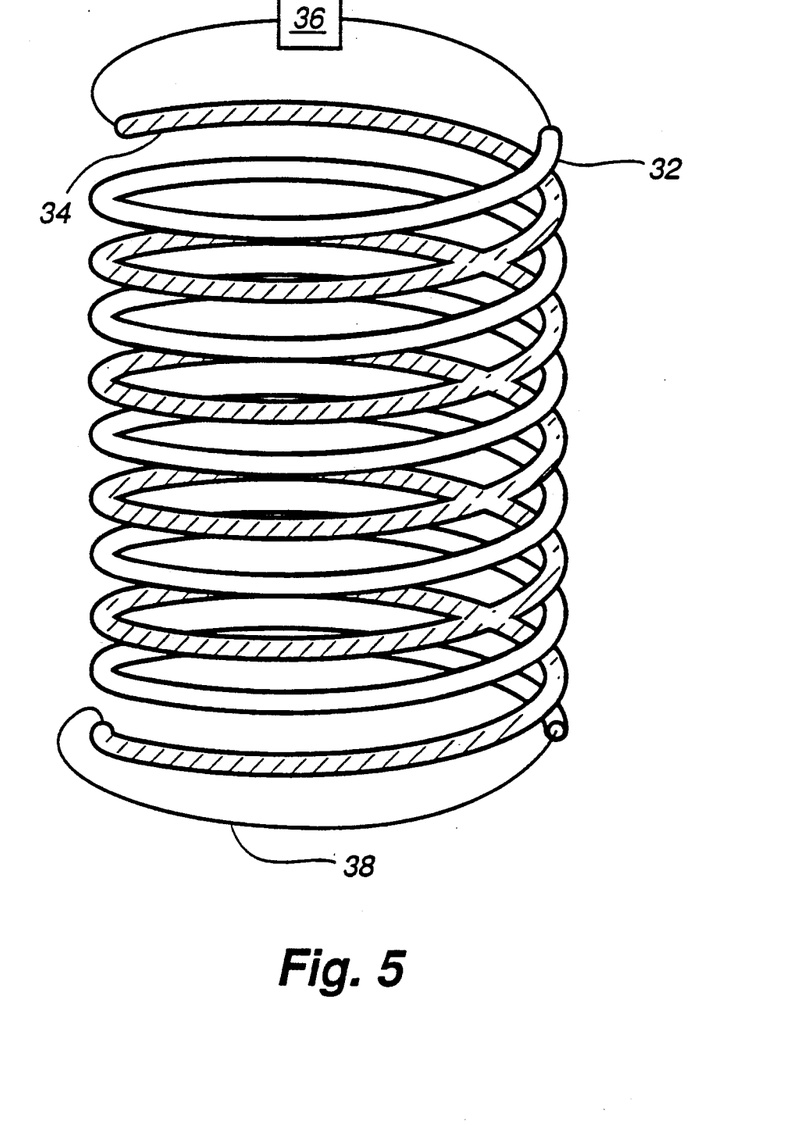
FIG. 5 is a schematic representation of the simplest helical array of equally spaced conductors (two conductors), alternate conductors carrying equal electrical currents in opposite directions.

FIG. 5 is a schematic representation of the simplest helical configuration of conductors useful for magnetic confinement of plasmas. Two electrical conductors, 32 and 34, are disposed in a helical manner about the surface of an imaginary cylinder. Electric current supply 36 provides equal current to the conductors, but in opposite directions. Conducting loop 38 provides a return for the electric current. A greater number of conductors may be employed so long as alternate conductors carry equal current to their nearest neighbors, and each conductor has an opposing conductor disposed on the diameter of the cylinder opposite thereto and carrying an equal current in the opposite direction. An axial force is generated on the conductors, yielding a hoop stress if the cylinder is formed into a circular configuration. However, this hoop stress can be minimized if the diameter of the circle is large. In the linear configuration illustrated in FIG. 5 hereof, radial forces on the conductors become very small as the spacing between the conductors becomes small. Small radial forces thereon are generated in the circular configuration.

Figure 6:
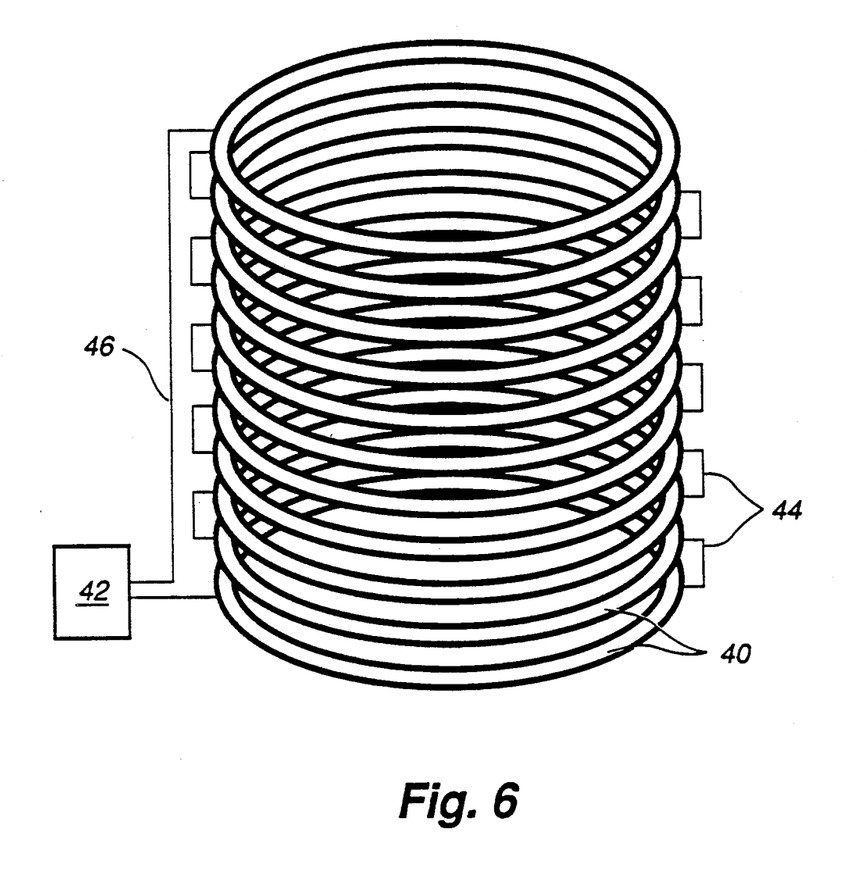
FIG. 6 is a schematic representation of a series of rings stacked along a common axis, each ring having the same electrical current as its neighbors, but flowing in the opposite direction thereto. Although the axial force experienced by the outer rings of the configuration increases as the rings are moved closer together, the axial force on the inner rings decreases as do the hoop stresses, while the plasma confining magnetic field increases, thereby increasing the utility of the device.

FIG. 6 is a schematic representation of a series of ring conductors stacked along a common axis. A magnetic field suitable for plasma confinement results if the rings have approximately the same diameter and carry about equal, but opposite electrical currents from that of their immediate neighboring rings. Current supply 42 and connecting conducting loops 44 demonstrate one manner of placing rings 40 in electrical connection using but a single current supply. Each of the rings would include many strands of wire so that conducting loops 44 would in fact carry little current in the process of generating large magnetic fields. As described hereinabove for the situation of a helical conductor configuration, the stacked rings may be formed into a circular configuration. This introduces hoop forces in place of axial forces on the rings, and generates small radial forces thereon. Again, the hoop forces may be reduced if the apparatus is constructed having a large circular diameter.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, it would be apparent to one having ordinary skill in the art of magnetic field generation, after having examined the subject disclosure, that the use of superconducting conductors and even high temperature superconducting conductors as they become available in forms capable of withstanding high magnetic fields and capable of carrying the enormous currents required, would be preferred over the use of wires having ordinary conduction properties. Moreover, to reduce plasma particle losses out of the ends of the open-configuration embodiments hereof, the diameter of the cross section of the conductor array may be gradually reduced at each end so that the magnetic field is increased in the region of the ends, thereby providing a reflective barrier for the charged particles. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A magnetic plasma containment apparatus having reduced mechanical forces, which comprises in combination a set of first substantially parallel, electrically isolated, elongated conducting elements spaced apart in a substantially equally distant manner around an outer circle having a first radius, all of said first conducting elements having a first current flowing therein in a first direction, and a set of second substantially parallel, electrically isolated, elongated conducting elements spaced apart in a substantially equally distant manner around an inner circle having a second radius, each of said second conducting elements being disposed in such a manner as to be approximately equally distant from the two of said first conducting elements nearest thereto, all of said second conducting elements having second current flowing therein in a direction opposite to the direction of the first current, and wherein the ratio of the magnitude of the second current to that of the first current, and the ratio of the second radius to the first radius are selected such that the net force on said first conducting elements and on said second conducting elements is substantially zero away from the ends thereof.

2. The plasma containment apparatus as described in claim 1, wherein the sum of said first conducting elements and the set of said second conducting elements contain an even number of conducting elements.

3. The plasma containment apparatus as described in claim 1, wherein the set of first conducting elements and the set of second conducting elements contain the same number of conducting elements.

4. The plasma containment apparatus as described in claim 1, wherein the ratio of the magnitude of the second current to that of the first current and the ratio of the second radius to the first radius are related to one another and to the number of conducting elements according to the following:

| Number of Elements | $R_n/R_p$ | $I_n/I_p$ |
| --- | --- | --- |
| 4 | 0.2679492 | 0.2679492 |
| 6 | 0.5264411 | 0.3819660 |
| 8 | 0.6718752 | 0.4514162 |
| 10 | 0.7578583 | 0.5000000 |
| 12 | 0.8126505 | 0.5366750 |
| 14 | 0.8498053 | 0.5657415 |
| 16 | 0.8762631 | 0.5895738 |
| 18 | 0.8958475 | 0.6096118 |
| 20 | 0.9108026 | 0.6267890 |
| 30 | 0.9511343 | 0.6867739 |
| 50 | 0.977248 | 0.750000 |
| 100 | 0.991965 | 0.817350 |
| 150 | 0.995631 | 0.848560 |

5. The plasma containment apparatus as described in claim 1, wherein said first conducting elements and said second conducting elements are formed into a substantially circular configuration in the long dimension thereof, the circular configuration having an approximate diameter which is large when compared to the cross section of any of said first conducting elements and said second conducting elements and large when compared to the approximate cross sectional diameter of the set of said first conducting elements.

6. The plasma containment apparatus as described in claim 1, wherein said first conducting elements and said second conducting elements include superconducting elements.

* * * * *